(12) United States Patent
Bhat

(10) Patent No.: US 12,502,084 B2
(45) Date of Patent: Dec. 23, 2025

(54) HEALTHCARE DEVICE FOR PERSONS SUFFERING FROM CHRONIC RESPIRATORY DISEASES

(71) Applicant: Anika Bhat, Fremont, CA (US)

(72) Inventor: Anika Bhat, Fremont, CA (US)

( * ) Notice: Subject to any disclaimer, the term of this patent is extended or adjusted under 35 U.S.C. 154(b) by 466 days.

(21) Appl. No.: 17/509,446

(22) Filed: Oct. 25, 2021

(65) Prior Publication Data

US 2022/0354372 A1 Nov. 10, 2022

Related U.S. Application Data

(60) Provisional application No. 63/186,614, filed on May 10, 2021.

(51) Int. Cl.
| | |
|---|---|
| A61B 5/0205 | (2006.01) |
| A61B 5/00 | (2006.01) |
| A61B 5/024 | (2006.01) |
| A61B 5/083 | (2006.01) |
| A61B 5/1455 | (2006.01) |

(52) U.S. Cl.
CPC ...... *A61B 5/02055* (2013.01); *A61B 5/02433* (2013.01); *A61B 5/0836* (2013.01); *A61B 5/1455* (2013.01); *A61B 5/742* (2013.01); *A61B 5/746* (2013.01)

(58) Field of Classification Search
None
See application file for complete search history.

(56) References Cited

U.S. PATENT DOCUMENTS

| | | | | |
|---|---|---|---|---|
| 2009/0151718 | A1* | 6/2009 | Hunter | A61B 5/087 600/538 |
| 2014/0278220 | A1* | 9/2014 | Yuen | A61B 5/681 702/150 |
| 2019/0060678 | A1* | 2/2019 | Poutiatine | A61Q 17/04 |
| 2020/0297955 | A1* | 9/2020 | Shouldice | G16H 40/67 |

FOREIGN PATENT DOCUMENTS

WO    WO-2017032873 A2 *    3/2017    .............  A61B 5/746

* cited by examiner

*Primary Examiner* — Benjamin J Klein
*Assistant Examiner* — Thien Jason Tran
(74) *Attorney, Agent, or Firm* — Barry Choobin; Patent 360

(57) ABSTRACT

A healthcare device for asthmatic patients that can help in reducing and avoiding risk factors that can trigger one or more symptoms of asthma. The healthcare device includes an infrared sensor, a pulse oximeter sensor, a UV sensor, an atmospheric sensor, and an air quality sensor for measuring values of different risk factors including ambient temperature, body temperature, blood oxygen saturation level, heart rate, intensity of ultraviolet radiations, humidity level, altitude, CO2 levels, and total volatile organic compounds (TVOCs).

12 Claims, 2 Drawing Sheets

|    | SpO2 (%) | Heart Rate (bpm) | Body Temp (°F) | Ambient Temp. (°F) | $CO_2$ (ppm) | TVOC (ppb) | Humidity (%) | Altitude (Feet) | UV Index |
|----|------|------|------|------|------|-------|------|------|-----|
| 1  | 99   | 80   | 96.7 | 69   | 540  | 17    | 49   | 760  | 1.7 |
| 2  | 96   | 81   | 97.6 | 72   | 400  | 0     | 51   | 583  | 1.6 |
| 3  | 97   | 76   | 96.8 | 66   | 506  | 6     | 35   | 435  | 1.1 |
| 4  | 100  | 74   | 97.0 | 53   | 669  | 11    | 46   | 395  | 2.3 |
| 5  | 99   | 77   | 96.5 | 69   | 457  | 0     | 37   | 525  | 2.5 |
| 6  | 96   | 141  | 114  | 82   | 1253 | 7520  | 90   | 961  | 3.1 |
| 7  | 97   | 127  | 106  | 89   | 1172 | 20110 | 85   | 967  | 4.3 |
| 8  | 97   | 130  | 108  | 91   | 5531 | 410   | 86   | 1451 | 3.6 |
| 9  | 97   | 140  | 111  | 87   | 9350 | 35042 | 55   | 963  | 3.2 |
| 10 | 98   | 142  | 119  | 92   | 5095 | 1215  | 73   | 960  | 4.1 |

Fig. 2

HEALTHCARE DEVICE FOR PERSONS SUFFERING FROM CHRONIC RESPIRATORY DISEASES

CROSS-REFERENCE TO RELATED APPLICATIONS

This application claims priority from the U.S. provisional patent application Ser. No. 63/186,614, filed on May 10, 2021, which is incorporated herein by reference in its entirety.

FIELD OF INVENTION

The present invention relates to a healthcare device, and more particularly, the present invention relates to a portable healthcare device for patients suffering from chronic respiratory diseases.

BACKGROUND

Chronic respiratory diseases, such as chronic obstructive pulmonary disease (COPD) and asthma do not have a cure till now, but the treatment is generally directed to reducing the symptoms and prevent escalation. The most common symptom of chronic respiratory diseases is breathlessness, and if not treated in time can lead to a severe health condition. In particular, the patients suffering from Asthma can have recurrent attacks of breathlessness and wheezing, which vary in severity and frequency from person to person. Symptoms may occur several times in a day or week in affected individuals, and for some people become worse during physical activity or at night. Several environmental factors are known that can trigger the aforesaid symptoms in a patient, such as allergens, temperature, sunlight, and like. The ideal solution for any kind of chronic respiratory disease is the reduction and avoidance of risk factors. According to an estimate, the number of asthma patients around the world is about 350 million. However, most of the research has been around drug delivery systems without any significant focus on reduction or avoidance of the risk factors.

Thus, a long-term desire is there for a healthcare device and a method for an asthmatic patient that can help in reducing and avoiding the risk factors.

The term "patients" hereinafter refers to the patients suffering from chronic respiratory diseases, in particular asthma. Also, the term "patients" is interchangeably used hereinafter with the phrase "asthmatic patients". The phrase "risk factors" hereinafter refers to both bodily factors and environmental factors that may trigger one or more symptoms of asthma in a patient.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a healthcare device for asthmatic patients that can help the patients to reduce and avoid the risk factors that may trigger one or more symptoms of asthma.

It is another object of the present invention that the healthcare device is portable.

It is still another object of the present invention that the healthcare device is wearable.

It is yet another object of the present invention that the healthcare device can be used for self-monitoring of the vitals.

It is a further object of the present invention that the healthcare device can track medications of the patient.

It is still a further object of the present invention that the healthcare device is economical to manufacture.

It is yet a further object of the present invention that the healthcare device is compact for storage and use.

It is an additional object of the present invention that the healthcare device can promote medication adherence.

It is still an additional object of the present invention that the healthcare device can alert a patient about the risk factors in near-real-time.

It is yet an additional object of the present invention that the healthcare device can help check the overuse or underuse of the medication in asthmatic patients.

It is an object of the present invention that the healthcare device allows remote monitoring of patient's health.

In one aspect, disclosed is a method for reducing and avoiding risk factors that can trigger one or more symptoms of chronic respiratory diseases, the method includes the steps of providing a healthcare device that includes a plurality of sensors configured to measure a plurality of risk factors, the plurality of risk factors includes ambient temperature, body temperature, blood oxygen saturation level, heart rate, intensity of ultraviolet radiations, humidity level, altitude, $CO_2$ levels, and total volatile organic compounds (TVOCs). The plurality of sensors can include an infrared sensor configured to measure the ambient temperature and the body temperature, a pulse oximeter sensor configured to measure the blood oxygen saturation level and the heart rate, a UV sensor configured to measure the intensity of ultraviolet radiations, an atmospheric sensor configured to measure the humidity level and the altitude, and an air quality sensor configured to measure the $CO_2$ levels and the total volatile organic compounds (TVOCs). The healthcare unit further includes a control unit operably coupled to the infrared sensor, the pulse oximeter sensor, the UV sensor, the atmospheric sensor, and the air quality sensor, wherein the control unit can be configured to receive a plurality of readings from the plurality of sensors, process the plurality of readings based on predefined rules, and upon processing, trigger one or more alerts. The method further includes the steps of receiving the plurality of readings from the plurality of sensors; processing, by the control unit, in near real-time, the plurality of readings to obtain one or more risk factors of the plurality of risk factors, wherein the one or more risk factors are having the readings within an abnormal values range; and upon processing, presenting in near real-time, by the control unit, the one or more alerts about the one or more risk factors.

In one implementation of the disclosed method, the one or more alerts can be presented in a visual form, wherein the healthcare device further includes one or more LEDs, wherein the one or more LEDs are blinked to present the one or more alerts. In one implementation of the disclosed method, the readings of the one or more risk factors are presented in a visual form on a display coupled to the control unit. In one implementation, the method can further include the steps of presenting in near real-time, by the control unit, one or more instructions on the display, wherein the one or more instructions are based on the one or more risk factors, and the one or more instructions are configured to instruct a patient in reducing and avoiding the one or more risk factors. In one case, the at least one risk factor of the one or more risk factors is the intensity of ultraviolet radiations, and an instruction of the one or more instructions is to apply a sunscreen. In one case, the at least one risk factor of the one or more risk factors is the total volatile organic compounds and an instruction of the one or more instructions is to take a prescribed medicine. In one case, the at least one risk factor of the one or more risk factors is the altitude, and an instruction of the one or more instructions is to take rest. The one or more alerts and the one or more instructions can also be presented as audio. In one implementation, the method further includes the steps of configuring the control unit with the predefined rules, wherein the predefined rules include values of the plurality of risk factors categorized in a plurality of consecutive levels of increasing risk, wherein each level of the plurality of consecutive levels has a range of values.

In one aspect, disclosed is a healthcare device for reducing and avoiding risk factors that can trigger one or more symptoms of chronic respiratory diseases, the healthcare device can include a plurality of sensors configured to measure values of a plurality of risk factors. The plurality of sensors includes an infrared sensor configured to measure ambient temperature and body temperature; a pulse oximeter sensor configured to measure blood oxygen saturation level and heart rate; a UV sensor configured to measure the intensity of ultraviolet radiations; an atmospheric sensor configured to measure humidity level and altitude; an air quality sensor configured to measure $CO_2$ levels and total volatile organic compounds (TVOCs). The healthcare device further includes a control unit operably coupled to the plurality of sensors, wherein the control unit is configured to receive in near real-time, a plurality of readings from the plurality of sensors; process the plurality of readings based on a set of predefined rules to obtain one or more risk factors of the plurality of risk factors, wherein the one or more risk factors are having the readings within an abnormal values range; and upon processing, present in near real-time, one or more alerts and one and more instructions related to the one or more risk factors.

In one implementation, the healthcare device further includes one or more LEDs protruding from a housing of the healthcare device, wherein the one or more alerts are presented through the one or more LEDs. The healthcare device can further include a buzzer or a speaker, wherein the one or more alerts are presented through the buzzer or the speaker. The healthcare device further includes a display coupled to the control unit, wherein the one or more instructions are presented on the display, the one or more instructions are configured to instruct a patient in reducing and avoiding the one or more risk factors.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 2 is a table showing the different risk factors, and normal and abnormal values for the risk factors, according to an exemplary embodiment of the present invention.

DETAILED DESCRIPTION

Figure 1:
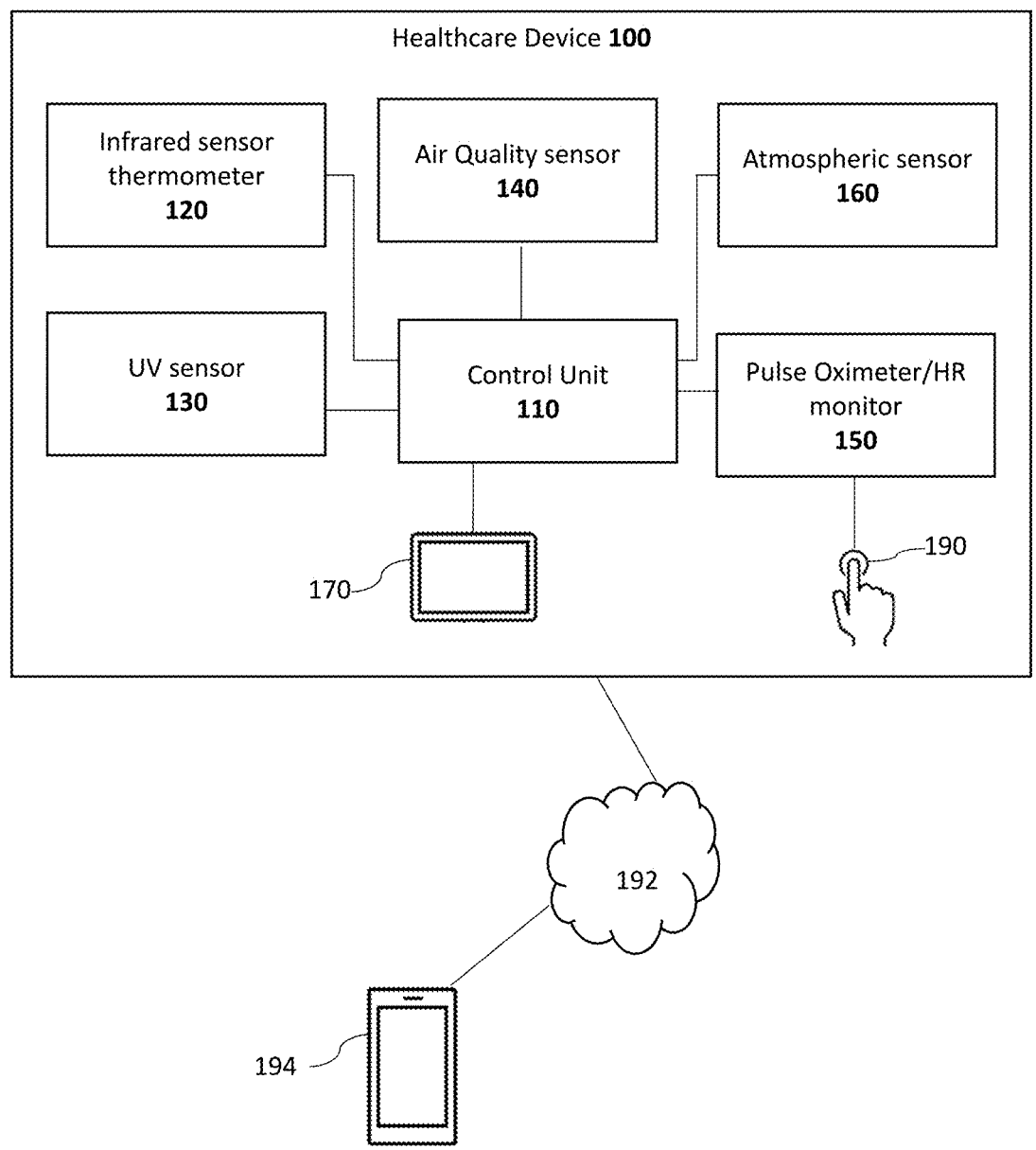
FIG. 1 is an environmental diagram showing the healthcare system coupled to a screen, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a healthcare device for patients suffering from chronic respiratory diseases that can be triggered by bodily factors and environmental factors. The disclosed healthcare device can be particularly useful for asthmatic patients in reducing and avoiding the risk factors that may trigger one or more symptoms of asthma. The healthcare device can be portable that can be carried by a patient in a pocket, purse, hand, and like methods known for carrying a smartphone. The healthcare device can also be implemented in a form of a wearable device that can be worn by the patient, such as around the wrist or suspended from the neck. Moreover, the healthcare device does not need to remain attached to the skin.

Referring to FIG. 1, which shows an exemplary embodiment of the healthcare device 100 for monitoring the risk factors and helping the patient in reducing and avoiding the risk factors. In particular, the healthcare device 100 can monitor the vitals of the patients and environmental factors in the immediate surrounding of the patients and can alert the patient in near-real-time of the potentially unfavorable conditions. In response, the patients can take precautionary steps to reduce and avoid the risk factors, in time, before the onset of symptoms or worsening of the symptoms.

In one exemplary embodiment, the healthcare device 100 can monitor the vital including, but not limited to, oxygen saturation levels of blood, heart rate, and body temperature. The healthcare device 100 can monitor the environmental factors, such as but not limited to carbon monoxide ($CO_2$) levels, total volatile organic compounds (TVOCs) in the air, humidity, ambient temperature, altitude, and UV-Index.

FIG. 1 shows the healthcare device 100 having a control unit 110 that can operably couple to different components of the healthcare device 100 for controlling the functions and show the information or alerts. The control unit 110 can have a microcontroller circuitry, such as a SparkFun Blynk Board ESP8266 that may optionally have a network circuitry. The network circuitry can permit the control unit to connect to an external network 192 which can be a wired or wireless network. The wired network may include DSL and optical fiber lines. The wireless network may include Bluetooth®, Wi-Fi, and cellular networks including GPRS, LTE, CDMA, 3G, 4G, and 5G. The network can be a secure network or an unsecured network. Also, known communication protocols can be used for communicating between the computing devices and the healthcare device 100 on a network. The control unit can connect to an external computing device, such as a smartphone, laptop, desktop, tablet computer, personal digital assistant ("PDA"). The computing device can include an operating system, such as but not limited to Android, iOS, Windows, macOS, and Linux. FIG. 1 shows the healthcare device 100 connected to a user device 194 through a Wi-Fi network 192.

An interface can optionally be provided on the user device for the interactions between the healthcare device 100 and the user device 194, such as alerts, configuration, settings, and like. The interface can be provided as application software that can be installed on the user device 194. The application software can be developed for Android™, iOS, and any other known operating platform for mobile devices. The application software can be made available through a distribution service provider, for example, Google Play™ operated and developed by Google, and the app store by Apple. In addition to the application software, a website-based interface can also be provided through the world-wide-web. The application software can also be provided for the desktop environment, such as Windows™, Linux, and macOS.

Again, referring to FIG. 1, the healthcare device 100 can include an infrared sensor thermometer 120 that can be used to measure both the body temperature of the patient and an ambient temperature. For measuring the body temperature, the patient can bring the device in proximity of a hand, head, neck, or another body part that may permit taking body temperature with predetermined accuracy. The infrared sensor thermometer 120 can be operably coupled to the control unit 110, wherein the control unit can receive a reading from the infrared sensor thermometer 120. The control unit 110 can be configured with rules for generating alerts based on different ranges of temperature. For example, the control unit 110 can generate an alert if the body temperature is found to be above 100.4° F. The IR sensors are known in the art, such as MLX90614 is a commercially available IR sensor, and such IR sensors are within the scope of the present invention.

The healthcare device 100 can also include a UV sensor 130, such as VML6075 is a commercially available UVA and UVB light sensor that can measure the power or intensity of the incident ultraviolet radiation. The UV sensor 130 can also be coupled to the control unit 110 such as the control unit can receive the readings from the UV sensor 130. The readings from the UV sensor 130 can be used for determining exposure to the ultraviolet radiations in the immediate surroundings of the patient. The ultraviolet radiation and the atmospheric temperature can be the risk factors that can trigger the symptoms of asthma. UV sensors are known in the art for measuring the intensity of ultraviolet radiations and such sensors are within the scope of the present invention.

An air quality sensor 140 can also be provided to measure the air quality in an immediate environment of the patient. The air quality can be indicative of the carbon dioxide ($CO_2$) and total volatile organic compounds (TVOCs) in the air. Such air quality sensors are known in the art, and such air quality sensors are within the scope of the present invention. It is understood that elements other than $CO_2$ and TVOCs can also be measured using the air quality sensor 140. The levels of carbon dioxide ($CO_2$) and total volatile organic compounds (TVOCs) are known risk factors. The air quality sensor 140 can be coupled to the control unit 110, wherein the control unit 110 can receive the readings from the air quality sensor 140. The control unit 110 can trigger the alert when an abnormal level of $CO_2$ or TVOCs can be detected by the air quality sensor 140.

A pulse oximeter 150 can also be incorporated, wherein the pulse oximeter 150 can couple to the control unit 110. A suitable sensor can be provided protruding from a housing of the healthcare device 100, wherein the patient can place a finger on the sensor. FIG. 1 shows the sensor 190 having a fingertip placed on the sensor. The pulse oximeter 150 can measure the oxygen saturation levels $SpO_2$ and heart rate of the patient through the finger placed on the sensor. The oxygen saturation levels ($SpO_2$), and heart rate can be the risk factors and suitable alerts can be generated if either the $SpO_2$ levels or the heart rate reach or are about to reach abnormal levels. What values of the risk factors can be normal and abnormal can be defined in the control unit, wherein the values can be categorized into consecutive levels, wherein each level has a range of value, and the consecutive levels can be of increasing levels of risk, such as normal level, risky, very risky, and highly risky levels. The normal levels can include a range of values that may be considered normal for a risk factor. For example, readings from an infrared thermometer falling within the range of values in the normal level indicates that the body temperature is normal. While a reading that falls within a range of values in risky level indicates that body temperature is high and can trigger the symptoms of asthma. The abnormal levels can vary from patient to patient, and the abnormal level for a patient can be determined using the normal level range of the patient. Such rules for the normal and risky levels have been defined for pulse oximeter but apply to all the sensors that are within the scope of the present invention.

An atmospheric sensor 160 can be used to measure humidity and altitude, both are the known risk factors for asthma. The atmospheric sensor 160 can also be coupled to the control unit, wherein the control unit can receive the readings of the humidity and altitude from the atmospheric sensor 160. Any extreme humidity can worsen the asthma symptoms. The disclosed healthcare device can warn about any abrupt increase in humidity and the patient can take appropriate precautions. The disclosed healthcare device can tell if what humidity levels are better suited for the patient or existing humidity levels are within the desired humidity levels. Altitude can also affect asthma, in particular, the high altitude can exaggerate the asthma symptoms. This is due to decreasing oxygen levels with increasing altitude. The disclosed healthcare device can tell when the altitude levels are within desired levels and what altitude levels can be dangerous for asthmatic patients. The disclosed healthcare device can warn the patient if the altitude levels are approaching riskier levels and the patient can either take appropriate medicine or avoid going to higher altitudes.

FIG. 1 shows different sensors that can be used to measure the values of body vitals and environmental factors for determining the risk factors. However, additional sensors can still be used to measure different parameters including the body vitals or the environmental factors, without departing from the scope of the present invention. The sensors shown in FIG. 1 can cover most of the risk factors known for triggering symptoms in asthmatic patients and patients suffering from other chronic respiratory diseases, such as COPD. However, still, additional sensors for additional risk factors can be incorporated within the disclosed healthcare device without departing from the scope of the present invention.

The control unit can receive readings from different sensors operably coupled to the control unit. The control unit can be configured with logical rules to check the values received from sensors—if they are normal or abnormal, and an alert should be triggered or not. The logical rules can be defined with the normal and abnormal values of the risk factor. Absolute values can be provided for normal and abnormal values with a sharp boundary. For example, the blood oxygen saturation level above 92% can be normal and below 92% can be abnormal. Alert can be generated by the controlled unit when the oxygen saturation level reaches below 92%. However, normal, and abnormal values can also be provided in levels of different risks, wherein each level can have a range of values. For example, four levels including normal, risky, very risky, and highly risky can be defined. It is understood that two or more levels are within the scope of the present invention. For example, the oxygen saturation level can also be defined in levels wherein the value above 95% can be considered normal, values less than and equal to 95% but more than 92% can be considered risky, values in the range of 92% to 88% can be considered very risky, and the value less than 88% percent can be considered highly risky. Moreover, such levels may not be static but can be customized or calibrated according to the patient medical state. For example, the body parameters under normal conditions can be evaluated, and based on the normal values of the parameters, the levels and the range of abnormal values can be determined or calibrated.

Different alerts can be generated for different levels. In case of very risky or highly risky, additional notifications can also be sent to a registered family member or healthcare professionals. Moreover, in case of a highly risky level, an emergency SOS call can also be made by the disclosed healthcare device. The healthcare device can also include a GPS unit for the location coordinates of the patient, wherein such location coordinates can also be shared with the notification.

The disclosed healthcare device can generate different alerts for different risk factors and the level of the value of the risk factor. In one case, a visual alert can be provided, wherein LEDs of different colors can be incorporated in the housing of the healthcare device. In one case, three LEDs can be provided of colors: green, yellow, and red. The green color may indicate that conditions are normal including the vitals and the environmental factors. Blinking of the yellow light may indicate risk and the red light may indicate highly risky conditions. The fourth LED of a different color, such as orange can also be provided that may indicate a very risky level. Additional information can also be displayed to the patient, such as the risk factor of the abnormal value. Instruction can also be provided for the patient to reduce and avoid the risk factors. For example, take rest when $SpO_2$ levels are low, apply sunscreen when the UV power values are high, and use a medicine, such as an inhaler to avoid breathlessness under risky or very risky levels, such instructions can be programmed in the control unit and can also be customized later during the use of the device. The additional information and instructions can be displayed on a screen or display, such as an LCD coupled to the housing of the healthcare device. FIG. 1 shows the LCD screen 170 coupled to the control unit 110. The LCD screen can be a part of the healthcare device or external to the healthcare device. The values of the risk factor, such as $SpO_2$, ambient temperature, humidity, and like can also be displayed on the LCD screen 170. Besides the visual alerts, audio alerts can also be provided as well as audio instructions can be provided by the healthcare device. The healthcare device can also include a buzzer or a speaker or both. Different sounds can be used for different levels of risk factors. For example, a continuous beep can indicate a highly risky condition with the audio instruction broadcasted to the patient to take appropriate precautions or step to prevent escalation of the symptoms. Three or four consecutive beeps can indicate one or more risk factors reaching the risky or very risky levels. It is understood that audio and visual alerts can be optional and customizable by the patient. For example, the patient can choose to stop audio alerts or may allow the audio alerts and stop the audio instruction.

The disclosed healthcare device can be connected to an external computing device, such as a smartphone, wherein the alerts can be broadcasted on the smartphone of the user. The smartphone can be paired with the disclosed healthcare device, such as the alerts can be presented on the smartphone in near-real-time. Both audio and visual alerts can be presented on the user's device. Additionally, the smartphone also has a vibration feature that can be used to alert the patient. The interface of the smartphone may provide additional features, such as recording the readings for a period and displaying the trend over the period in graphical forms. More detailed instructions and comparisons between past and current abnormal values with normal values can also be displayed graphically or in verbose form. Detail instructions can also be provided on the user interface implemented on the smartphone. It is understood that other computing devices, such as smartwatches, desktop computers, iPad, etc. carried by the patient can be used for presenting the alerts. One or more settings or configurations of the control unit can be configured, modified, or calibrated through the external computer device.

The disclosed healthcare device can be equipped with additional functionalities. In one case, the disclosed healthcare device can track the medication compliance of the patient. Besides instructing the patient to take the medicine under unfavorable conditions, the healthcare system can also instruct the patient to take the medicine under normal conditions. The healthcare system can also confirm if the patient has taken the medication. For example, when in a very risky level condition, the patient is alerted and instructed by the healthcare device to take the medicine, the healthcare device can detect the presence of the inhaler nearby, such as in the hand of the patient. The healthcare device can detect the presence of inhaler by technologies known in the art, such as NFC wherein the patient can touch the inhaler to the healthcare device or RFID technologies can also be used. The healthcare device can be configured to measure one or more risk factors automatically and for others, the intervention of the patient can be requested. For example, the ambient temperature can be taken automatically while for the body temperature, the patient can be requested to bring his finger near the healthcare device. Similarly, for the blood saturation levels and the heart rate, the patient can be requested to put a finger on the sensor. The requests can be made at predetermined periods. Moreover, a risk factor can be evaluated based on the value of another risk factor. For example, upon detecting a high ambient temperature outside, the patient can be requested to put the finger on the pulse oximeter sensor for measuring $SpO_2$.

In one exemplary embodiment, the disclosed healthcare device upon detecting an abnormal condition can recommend precautions and taking medications. The disclosed healthcare device also monitors the patient till the abnormal values of the risk factors reach normal levels. For example, upon detecting low blood oxygen saturation levels SpO2, the disclosed healthcare device can advise the patient to take the inhaler. After every four hours or any suitable period, the disclosed healthcare device can remind the patient to check the SpO2 level by placing the finger on the sensor. Current readings can be compared to old ones to check the improvement in the condition of the patient. Based on the condition, the patient can be advised to again take the inhaler or see a doctor.

Referring to FIG. 2 which shows the various risk factors and values of the risk factors that were used to evaluate the disclosed healthcare device in an artificially created environment. Rows 1-5 have normal values for the different risk factors and rows 6-10 in the table have abnormal values of the risk factors. The disclosed device can help the patient stay indoors and outdoors with the right use of medicines and reducing and avoiding risk factors. Overuse & under use of medication, which is one of the main issues in asthma management can be managed.

The primary benefit of the disclosed healthcare device can be remote monitoring of the patient. A person, such as a caregiver, family member, or a physician/doctor can remotely check different parameters measured by the disclosed healthcare device. For example, application software can be downloaded on a remote device, such as a smartphone. The remote device can be connected to the healthcare device remotely through a network or cloud network. The remote device can receive current and optionally past readings taken by the healthcare device. Additionally, the healthcare device can send alerts, messages, SOS alerts, emails, and like methods of notification known to a skilled person. For example, an SOS alert can be sent to caregivers and healthcare personals in case of an emergency based on elevated levels of one or more risk factors detected by the healthcare device. In one exemplary embodiment, the data collected by the healthcare device over a predefined period, such as 15 days and a month can be stored for review. The data can include values of different parameters or risk factors, wherein the data can be date and time-stamped. Additionally, an interface can be provided for analyzing the data, wherein the range of values collected during the period can be presented in the form of static or dynamic charts or graphics. Using the analytical interface, the physical can review changes over time. For example, a physician can also monitor how well a patient's symptoms are controlled. If a patient's symptoms get worse (for example blood oxygen is consistently lower than the normal level for extended periods), then doctors can adjust the medication. The healthcare device can also include GPS circuitry for detecting the location of the healthcare device. The data collected by the healthcare device can also be embedded with location information, wherein the doctor can also review the changes in values of the risk factors in different environments or places. Additionally, while sending an emergency message, the GPS location of the healthcare device and thus the patient can also be sent with the alert.

The application software can be provided for computing devices such as smartphones, desktops, laptops, tablet computers, smartwatches, and the like. The computing device can belong to the user, a remote person, a doctor, or any concerned person. Depending upon the intended use, the application software can display current and old readings and data of different risk factors. The application software can also display any recommendations or instructions for the patient. The application software can also provide for analysis of the measurement data over a period, such as 1 month or 3 months, or 12 months. The values or changes in the values over time can be present in the form of graphics for easy review and interpretation. The application software can be made available through a distribution service provider, for example, Google Play™ operated and developed by Google, and the app store by Apple. In addition to the application software, a website-based interface can also be provided through the world-wide-web. The application software can also be provided for the desktop environment, such as Windows™, Linux, and macOS. The healthcare device can be implemented as a wearable form that can be worn by the patient, or as a portable device that can be carried in a purse or pocket, or as a device that can be placed in a room.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for generating alerts for reducing and avoiding risk factors that can trigger one or more symptoms of chronic respiratory diseases and tracking medication compliance, the method comprising:

determining a plurality of readings from a wearable and portable healthcare device comprising:
    a plurality of sensors configured to measure a plurality of risk factors, the plurality of risk factors comprising ambient temperature, body temperature, blood oxygen saturation level, heart rate, intensity of ultraviolet radiations, humidity level, altitude, $CO_2$ levels, and total volatile organic compounds (TVOCs),
    the plurality of sensors comprises:
      an infrared sensor configured to measure the ambient temperature and the body temperature,
      a pulse oximeter sensor configured to measure the blood oxygen saturation level and the heart rate,
      a UV sensor configured to measure the intensity of ultraviolet radiations, an atmospheric sensor configured to measure the humidity level and the altitude, and an air quality sensor configured to measure the $CO_2$ levels and the total volatile organic compounds (TVOCs), and a control unit operably coupled to the plurality of sensors, wherein the control unit, in near real time, is configured to:

receive a plurality of readings from the plurality of sensors, process the plurality of readings based on predefined rules, and upon processing, trigger one or more alerts;

receiving, by the control unit, in near real time, the plurality of readings from the plurality of sensors;

processing, by the control unit, in near real-time, the plurality of readings to obtain one or more risk factors of the plurality of risk factors, wherein the one or more risk factors are having the readings within an abnormal values range; and upon processing, presenting in near real-time, by the control unit, the one or more alerts and additional information to reduce or avoid risk factors that trigger the one or more symptoms of the chronic respiratory diseases;

sending notifications about the alerts to a registered person; and creating emergency SOS calls in case of risk to a wearer of the healthcare device, wherein the plurality of readings are date, time, and location stamped, wherein the healthcare device comprises a GPS circuitry, wherein the method further comprises analyzing the healthcare device to obtain changes in values of the risk factors over time and in different environments or places, wherein the plurality of readings are analyzed to review changes in values of the risk factors in different environments, wherein the method further comprises detecting by the healthcare device about a presence of a nearby inhaler, wherein the additional information comprises precautions and actions to be taken by the wearer.

2. The method according to claim 1, wherein the one or more alerts are presented in a visual form, wherein the healthcare device further comprises one or more LEDs, wherein the one or more LEDs are blinked to present the one or more alerts.

3. The method according to claim 1, wherein the readings of the one or more risk factors are presented in a visual form on a display coupled to the control unit.

4. The method according to claim 1, wherein at least one risk factor of the one or more risk factors is the intensity of ultraviolet radiations, and the additional information is to apply a sunscreen.

5. The method according to claim 1, wherein at least one risk factor of the one or more risk factors is the total volatile organic compounds and the additional information is to take a prescribed medicine.

6. The method according to claim 1, wherein at least one risk factor of the one or more risk factors is the altitude, and the additional information is to take rest.

7. The method according to claim 1, wherein the one or more alerts and the additional information are also outputted in audio form.

8. The method according to claim 1, wherein the method further comprises the steps of:

configuring the control unit with the predefined rules, wherein the predefined rules comprise values for the plurality of risk factors categorized in a plurality of consecutive levels of increasing risk, wherein each level of the plurality of consecutive levels has a range of values.

9. A healthcare device, that is wearable and portable, for generating alerts for reducing and avoiding risk factors that can trigger one or more symptoms of chronic respiratory diseases, the healthcare device comprises:

a plurality of sensors configured to measure values of a plurality of risk factors, the plurality of sensors include:

an infrared sensor configured to measure ambient temperature and body temperature;

a pulse oximeter sensor configured to measure blood oxygen saturation level and heart rate;

a UV sensor configured to measure an intensity of ultraviolet radiations;

an atmospheric sensor configured to measure humidity level and altitude;

an air quality sensor configured to measure $CO_2$ levels and total volatile organic compounds (TVOCs); and a control unit operably coupled to the plurality of sensors, wherein the control unit is configured to:

receive in near real-time, a plurality of readings from the plurality of sensors;

process the plurality of readings based on a set of predefined rules to obtain one or more risk factors of the plurality of risk factors, wherein the one or more risk factors are having the readings within an abnormal values range;

upon processing, present in near real-time, one or more alerts and additional information to reduce or avoid risk factors that trigger the one or more symptoms of the chronic respiratory diseases;

sending notifications about the alerts to a registered person; and creating emergency SOS calls in case of risk to a wearer of the healthcare device, wherein the plurality of readings are date, time, and location stamped, wherein the healthcare device further comprises a GPS circuitry, wherein the control unit is further configured to analyze data to obtain changes in values of the risk factors over time and in different environments or places, wherein the plurality of readings are analyzed to review changes in values of the risk factors in different environments, wherein the healthcare device is further configured to detect a presence of a nearby inhaler, wherein the additional information comprises precautions and actions to be taken by the wearer.

10. The healthcare device according to claim 9, wherein the healthcare device further comprises one or more LEDs protruding from a housing of the healthcare device, wherein the one or more alerts are presented through the one or more LEDs.

11. The healthcare device according to claim 9, wherein the healthcare device further comprises a buzzer or a speaker, wherein the one or more alerts are outputted through the buzzer or the speaker.

12. The healthcare device according to claim 9, wherein the healthcare device further comprises a display coupled to the control unit, wherein the additional information is presented on the display.

* * * * *